United States Patent
Knee

(10) Patent No.: US 10,692,176 B2
(45) Date of Patent: Jun. 23, 2020

(54) DECODING A BAYER-MASK OR LIKE CODED IMAGE

(71) Applicant: Snell Advanced Media Limited, Newbury, Berkshire (GB)

(72) Inventor: Michael James Knee, Petersfield (GB)

(73) Assignee: GRASS VALLEY LIMITED, Newbury, Berkshire (GB)

( * ) Notice: Subject to any disclaimer, the term of this patent is extended or adjusted under 35 U.S.C. 154(b) by 122 days.

(21) Appl. No.: 15/899,236

(22) Filed: Feb. 19, 2018

(65) Prior Publication Data
US 2018/0240215 A1    Aug. 23, 2018

(30) Foreign Application Priority Data
Feb. 17, 2017 (GB) .................................. 1702632.9

(51) Int. Cl.
| G06K 9/36 | (2006.01) |
| G06T 3/40 | (2006.01) |
| G06T 7/90 | (2017.01) |
| G06T 9/00 | (2006.01) |

(52) U.S. Cl.
CPC .............. G06T 3/4015 (2013.01); G06T 7/90 (2017.01); G06T 9/00 (2013.01); *G06T 2207/20024* (2013.01)

(58) Field of Classification Search
None
See application file for complete search history.

(56) References Cited

U.S. PATENT DOCUMENTS

| 2008/0199105 A1* | 8/2008 | Knee .................. H04N 9/045 382/300 |
| 2008/0240559 A1 | 10/2008 | Malvar |
| 2009/0010539 A1 | 1/2009 | Guarnera et al. |
| 2009/0027525 A1 | 1/2009 | Lin et al. |
| 2017/0124682 A1* | 5/2017 | Azuma ................. G06T 3/4015 |

OTHER PUBLICATIONS

Search Report from the United Kingdom Intellectual Property Office for Application No. GB1702632.9 dated Aug. 4, 2017 (1 page).
Lu, Wenmiao et al., "Color Filter Array Demosaicking: New Method and Performance Measures", IEEE Transactions on Image Processing, vol. 12, No. 10, Oct. 2003, pp. 1194-1210.
Li, Xin et al., "New Edge-Directed Interpolation", IEEE Transactions on Image Processing, vol. 10, No. 10, Oct. 2001, pp. 1521-1527.
Extended European Search Report from the European Patent Office for Application No. 18157493.0 dated Jun. 22, 2018 (8 pages).

* cited by examiner

*Primary Examiner* — Sean M Conner
(74) *Attorney, Agent, or Firm* — Arent Fox LLP

(57) ABSTRACT

A Bayer-mask is decoded by forming a decoded green array, calculating red green and blue-green color difference signals, deriving a first full-resolution grid of each colour difference signal using a first interpolation filter; deriving a second full-resolution grid of each colour difference signal using a second interpolation filter taking a larger number of colour difference signal inputs than the first; generating a cross-colour weighting signal; and forming a mixed colour difference signal from the first and second full-resolution grids in accordance with the cross-colour weighting signal.

17 Claims, 4 Drawing Sheets

Figure 1

| R | G | R | G | R |
| G | B | G | B | G |
| R | G | R | G | R |
| G | B | G | B | G |
| R | G | R | G | R |
| G | B | G | B | G |
| R | G | R | G | R |
| G | B | G | B | G |

DECODING A BAYER-MASK OR LIKE CODED IMAGE

FIELD OF THE INVENTION

This invention relates to the decoding of colour components, for example a Bayer-mask or like coded image.

BACKGROUND OF THE INVENTION

A Bayer mask is typically used to allow colour component signals to be derived from any array of CCD or other sensing elements, which do not in themselves discriminate colour. A Bayer mask will typically be used to derive red (R), green (G) and blue (B) signals and comprises a rectangular array of R, G and B filters. Since the human eye is more sensitive to brightness than colour, and since the green signal contributes most to the perception of brightness, G filters predominate in the Bayer mask and are quincunxially sampled.

A Bayer mask decoder is used to convert a Bayer mask signal (which has for each sensing element—or pixel—only one of the three R, G and B signals) to an image signal which has at each pixel an R signal, a G signal and a B signal.

It is well known that cross-colour artefacts can result from simple Bayer mask decoders. Many suggestions have been made for reducing these artefacts. Reference is directed, for example, to GB2426881A which discloses a decoder based on non-adaptive linear filters. This decoder performs well on the quincunxially sampled (usually the green) component but exhibits cross-colour artefacts on the more sparsely sampled other (red and blue) components.

SUMMARY OF THE INVENTION

There is here provided a method of decoding a Bayer-mask or like coded image comprising a value for one of a set of colours at each pixel of the image, to provide a decoded value for each of the set of colours at each pixel of the image, comprising the steps of: deriving from the coded image an array having for a selected colour a value at each pixel of the image; calculating from the array a colour difference signal at each of the pixels associated with other colours; deriving a first full-resolution grid of each colour difference signal using a first interpolation filter; deriving a second full-resolution grid of each colour difference signal using a second interpolation filter taking a larger number of colour difference signal inputs than said first interpolation filter; generating a cross-colour weighting signal having a value at each pixel; and forming a mix between said first and second grids in accordance with a cross-colour suppression signal derived from said cross-colour weighting signal.

Typically, the selected colour is green and the other colours are red and blue.

The step of generating a cross-colour weighting signal may comprise forming the sum and difference of the colour difference signals.

The step of forming the cross-colour suppression signal may comprise measuring the variance of the cross-colour weighting signal within a rolling window of pixels, for example a square window of N by N pixels where N is 5, 10 15 or more.

The variance of the cross-colour weighting signal may be multiplied by a local activity measure derived—for example—by forming the absolute value of a spatial gradient at each pixel and applying a spatial filter.

BRIEF DESCRIPTION OF THE DRAWINGS

The invention will now be described by way of examples with reference to the accompanying drawings in which:

FIG. 1 is a schematic representation of a Bayer mask or Bayer mask image;

DETAILED DESCRIPTION OF THE EMBODIMENTS

Figure 1:
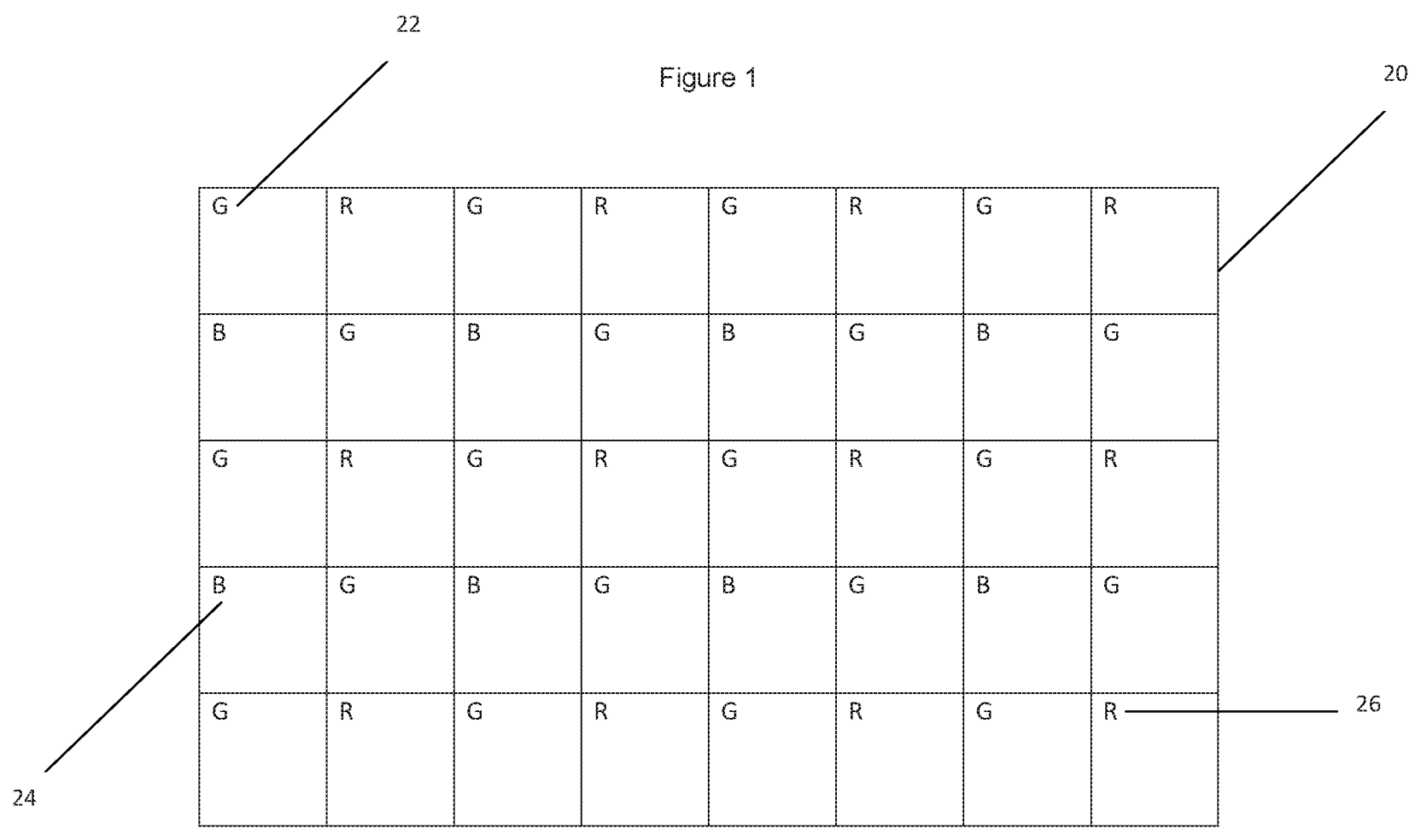

Referring to FIG. 1, it will be seen that a Bayer mask has a quincunxial arrangement of green elements. Alternating rows have red and blue elements, respectively, in the spaces between the green elements. The corresponding Bayer mask signal or image then has quincunxial green samples or pixels with alternating rows have red and blue samples or pixels, respectively, in the spaces between the green samples or pixels. It will be understood that a Bayer mask signal can be formed in ways other than positioning a Bayer mask in front of a sensor array. It will also be understood that although the Bayer mask is widely used in video, there are other forms of coded images comprising a value for one of a set of colours at each pixel of the image and requiring decoding to provide a decoded value for each of the set of colours at each pixel of the image.

Figure 2:
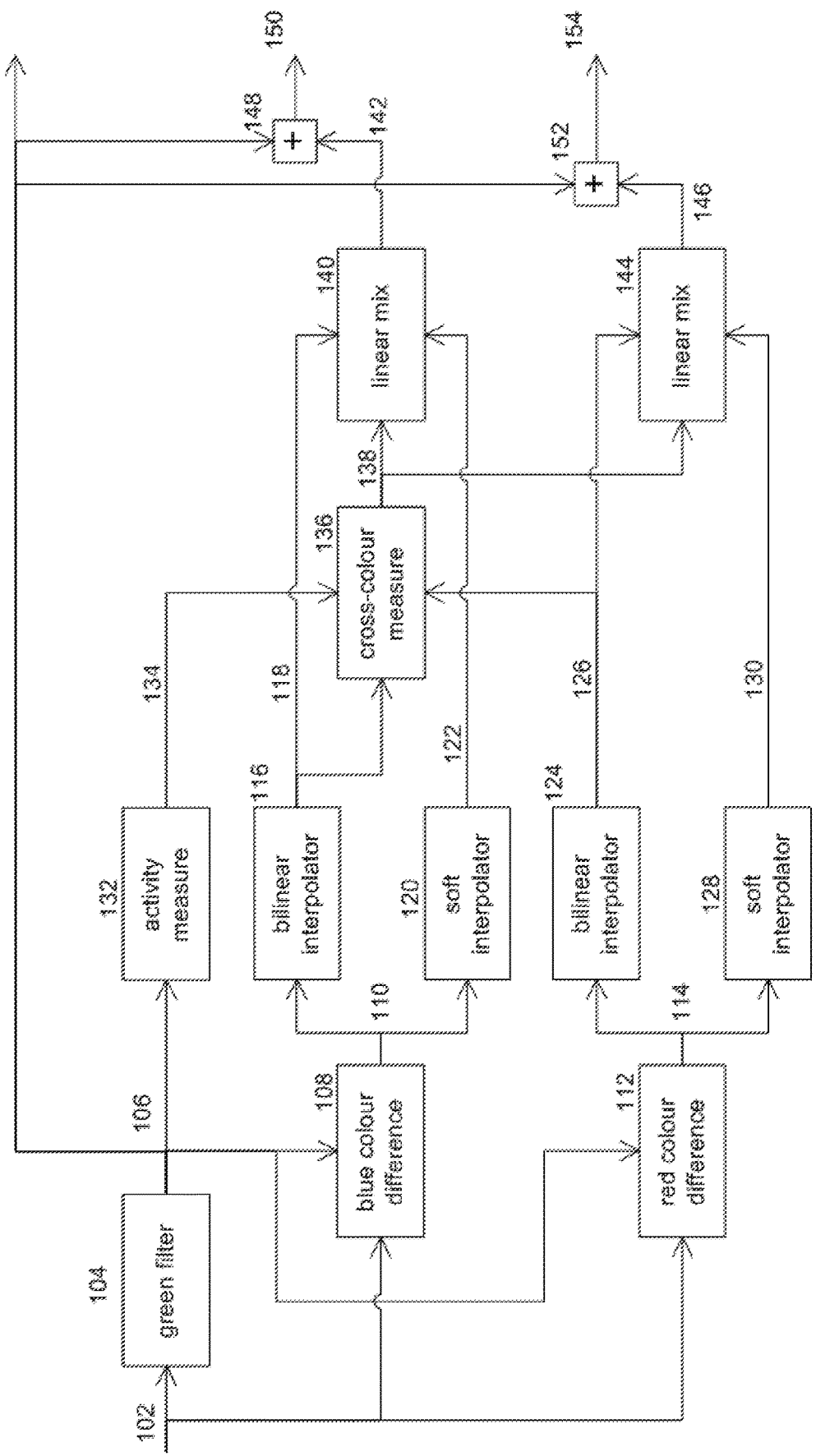
FIG. 2 is a diagram illustrating apparatus according to the invention.

FIG. 2 shows a decoder circuit which receives as its input a Bayer mask image as illustrated in FIG. 1 and which outputs decoded R, B and G signals, each having a value at each pixel.

It should be noted in the following descriptions that compensating delays are not always shown, and where not shown are assumed to have been applied where necessary at the inputs to any circuits where two or more signals are combined.

Referring to FIG. 2, a Bayer-mask signal 102 is filtered in two-dimensional filter 104 to generate a full-resolution grid of green samples 106.

An example filter 104 is shown below (with the quoted values to be divided by 32) with zeros placed at the off-grid input sample locations.

| -2 | -2 | -1 | -2 | -2 |
|----|----|----|----|----|
| -2 | 4  | 12 | 4  | -2 |
| -1 | 12 | 28 | 12 | -1 |
| -2 | 4  | 12 | 4  | -2 |
| -2 | -2 | -1 | -2 | -2 |

Thus, when this 5 by 5 filter is centred on a B or R pixel, the operating values are:

|    | -2 |    | -2 |    |
|----|----|----|----|----|
| -2 |    | 12 |    | -2 |
|    | 12 |    | 12 |    |
| -2 |    | 12 |    | -2 |
|    | -2 |    | -2 |    |

And when the filter is centred on a G pixel, the operating values are:

|    |   |    |   |    |
|----|---|----|---|----|
| −2 |   | −1 |   | −2 |
|    | 4 |    | 4 |    |
| −1 |   | 28 |   | −1 |
|    | 4 |    | 4 |    |
| −2 |   | −1 |   | −2 |

Next, the input signal 102 is processed in circuit 108 to form blue colour difference signal B−G (110), and in circuit 112 to form red colour difference signal R−G (114). The blue colour difference circuit 108 consists of a subtractor operating at the input B sample sites which subtract the G samples 106 at those sites from the B samples to produce B−G colour difference samples 110. Likewise, the red colour difference circuit 112 consists of a subtractor operating at the input R sample sites which subtract the G samples 106 at those sites from the R samples to produce R−G colour difference samples 114.

The blue colour-difference signal 110, currently only valid at original B sample sites, is passed to a bilinear interpolator 116 well known in the art to generate a complete grid 118 of B−G samples, and to a soft interpolator 120 to generate a complete grid of 122 of soft B−G samples. Likewise, the red colour-difference signal 114, currently only valid at original R sample sites, is passed to a bilinear interpolator 124 well known in the art to generate a complete grid 126 of R−G samples, and to a soft interpolator 128 to generate a complete grid of 130 of soft R−G samples. A suitable aperture for the soft interpolators 120 and 128 is [1 2 2 2 2 2 2 2 1]/16 applied horizontally and then vertically on a full-resolution grid with zeros inserted where input samples are not defined.

Figure 3:
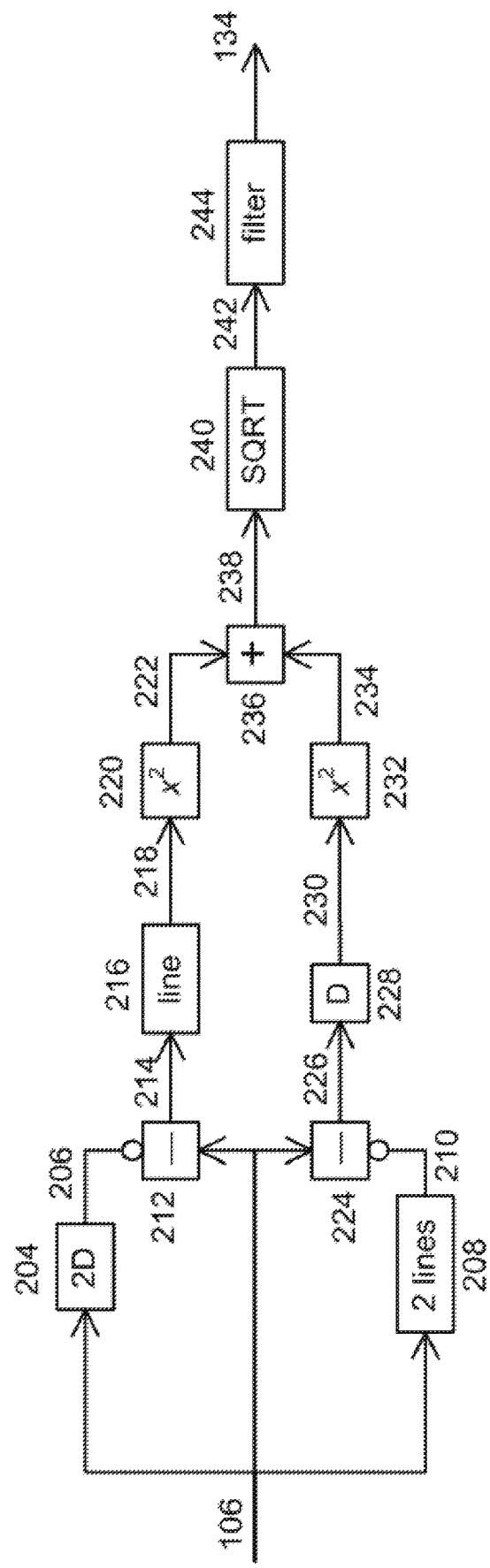
FIGS. 3 and 4 are diagrams illustrating in more detail parts of the apparatus shown in FIG. 2.

The full-resolution green signal 106 is applied to an activity calculation circuit 132 to produce an activity signal 134. The operation of circuit 132 will now be described in greater detail with reference to FIG. 3. The full-resolution G signal 106 is subtracted across a 2-sample delay 204 (whose output is signal 206) by subtractor 212 whose output 214 is passed through a one-line compensating delay 216 to produce the horizontal gradient signal 218, which is then squared in circuit 220 to produce squared horizontal gradient signal 222. Signal 106 is also subtracted across a 2-line delay 208 (whose output is signal 210) by subtractor 224 whose output 226 is passed through a one-sample compensating delay 228 to produce the vertical gradient signal 230, which is then squared in circuit 232 to produce squared vertical gradient signal 234.

The two squared gradient signals 222 and 234 are summed in adder 236 to produce a combined squared gradient signal 238, whose square root is taken in circuit 240 to produce an unfiltered activity signal 242. That signal is then filtered in filter circuit 244 to produce a filtered activity signal 134. An example of the filter circuit 244 is a [1 2 1]/4 aperture applied horizontally and then vertically.

Figure 4:
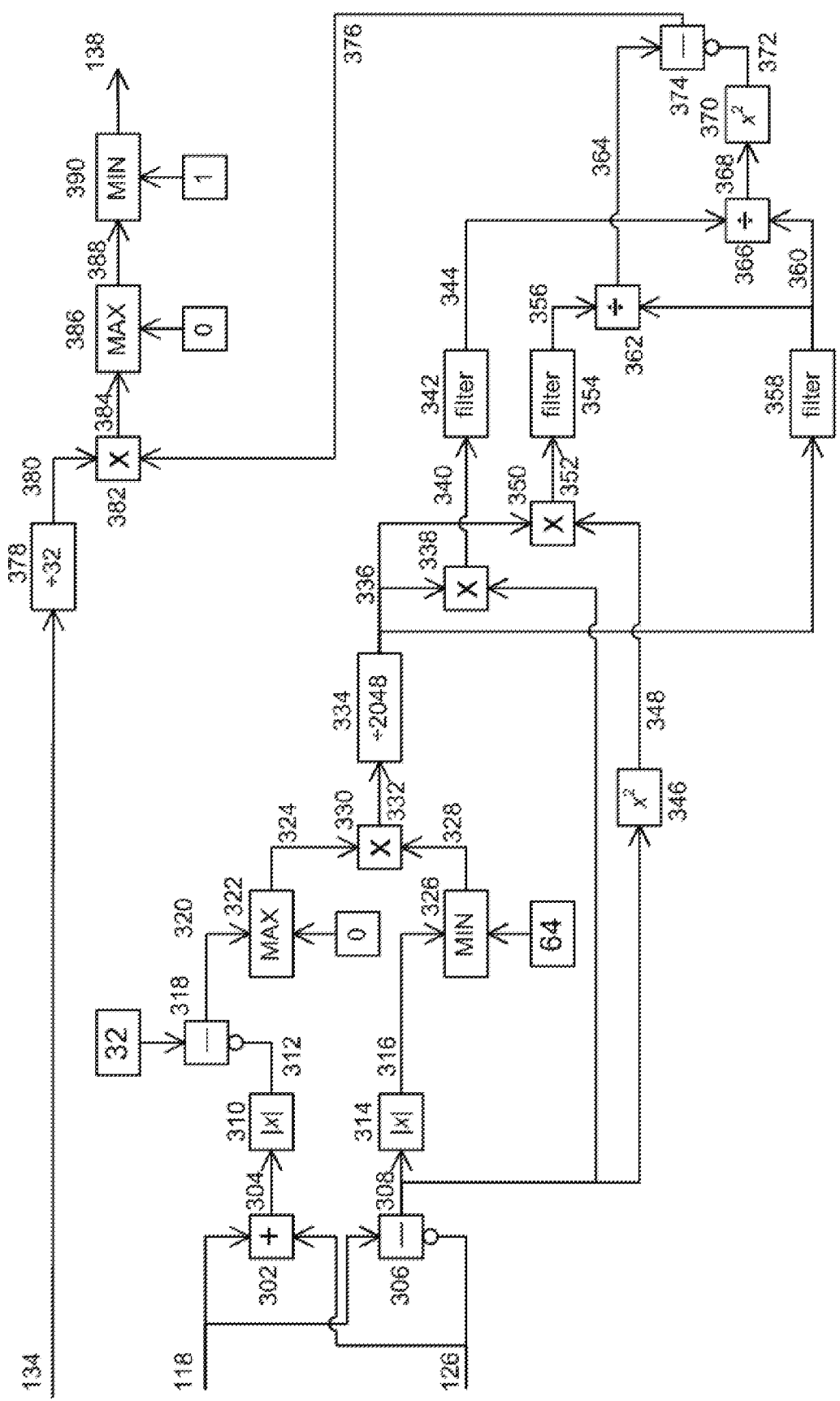

Returning to FIG. 2, the interpolated blue and red colour difference signals 118 and 126 and the activity measure 134 are passed to cross-colour measurement circuit 136 to produce a cross-colour signal 138. The operation of circuit 136 will now be described in greater detail with reference to FIG. 4. In the description that follows, constant values are based on the use of a range of 256 for the input video signals.

The two colour difference signals 118 and 126 are summed in adder 302 to produce their sum 304, and are subtracted in subtractor 306 to produce their difference 308. The absolute values of the sum and difference signals are taken in circuits 310 and 314 to produce signals 312 and 316. The absolute sum 312 is subtracted from the constant value of 32 in subtractor 318 to produce signal 320, which is then constrained to be positive by the action of the maximum function in circuit 322 to produce a first cross-colour factor 324. The absolute difference 316 is constrained to be at most 64 by the application of the minimum function in circuit 326 to produce a second cross-colour factor 328. The product 332 of the cross-colour factors 324 and 328 is taken in multiplier 330, and then scaled in circuit 334 by dividing by 2048 to produce a cross-colour weighting signal 336.

The difference signal 308 is also squared in circuit 346 to produce a squared difference signal 348. The difference signal 308, its square 348 and the cross-colour weighting signal 336 are combined in three different ways and filtered as follows:

Firstly, signals 336 and 308 are multiplied together in multiplier 338 to produce product 340 which is filtered in filter circuit 342 to produce signal 344.

Secondly, signals 336 and 348 are multiplied together in multiplier 350 to produce product 352 which is filtered in filter circuit 354 to produce signal 356.

Thirdly, signal 336 is directly filtered in filter circuit 358 to produce a normalising signal 360.

Suitable filters 342, 354 and 358, which should be identical, are defined by the 17-tap aperture [1 2 2 2 2 2 2 2 2 2 2 2 2 2 2 2 1]/32 applied horizontally and then vertically.

Filter output 344 is divided by filter output 360 in divider 362 to produce a first normalized signal 364. Likewise, filter output 356 is divided by filter output 360 in divider 366 to produce signal 368, whose square is taken in circuit 370 to produce a second normalised signal 372.

The difference between the two normalised signals is taken in subtractor 374 to produce difference signal 376. The activity measure 134 is divided by 32 in circuit 378 to produce a scaled activity measure 380, which is multiplied by difference signal 376 in multiplier 382 to produce product 384, which in turn is constrained to the range [0, 1] by the action of maximum function 386 followed by minimum function 390. The constrained output is the cross-colour suppression signal 138.

Returning to FIG. 2, the final outputs of the apparatus are calculated as follows.

The final green output is the signal 106 already described.

The cross-colour suppression signal 138 is used in mixer 140 to control a linear mix between the interpolated blue colour difference signal 118 and the soft interpolated blue colour difference signal 122 to produce a blue colour difference output 142. The action of the mixer 140 is such that its output 142 varies linearly between input 118 and input 122 as the control signal 138 varies between 0 and 1. The green signal 106 is added back onto the blue colour difference output 142 in adder 148 to produce the final blue output 150.

Likewise, the cross-colour suppression signal 138 is used in mixer 144 to control a linear mix between the interpolated red colour difference signal 126 and the soft interpolated red colour difference signal 130 to produce a red colour difference output 146. The action of the mixer 144 is such that its output 146 varies linearly between input 126 and input 130 as the control signal 138 varies between 0 and 1. The green signal 106 is added back onto the red colour difference output 146 in adder 152 to produce the final red output 154.

It will be understood that a number of the operations performed by the above described apparatus can be omitted in certain applications and that the filter coefficients and other parameters of the described circuits are given by way of example only.

In a more general sense, a process to be performed by apparatus according to the invention might include the following steps:
1. First, a full-resolution grid of green samples is calculated using any appropriate known method, one example being the filter described in the above prior application.
2. Calculate colour-difference signals u=B−G and v=R−G on the blue and red sample grids respectively, using the already decoded co-sited green samples.
3. Calculate a full-resolution grid of each colour-difference signal using bilinear interpolation.
4. Calculate a softer full-resolution grid of each colour-difference signal using larger (e.g. 9-tap) linear filters.
5. Calculate a cross-colour weighting signal for example from the sum and difference of the two colour-difference signals.
6. Calculate a cross-colour suppression signal which may for example be based on or equal to the variance of the cross-colour weighting signal within a rolling window.
7. The final colour-difference output is a mix between the original and the softer grid, controlled by the cross-colour suppression signal.

Optionally, the local activity is calculated (for example as an absolute value of a spatial gradient for each pixel), which may be filtered with a simple spatial filter. The variance of the cross-colour weighting signal is then multiplied by the local activity to provide the cross-colour suppression signal.

This process is technically simple, is relatively "safe" in terms of introduction of unwanted artefacts, and significantly reduces cross-colour in detailed areas, compared to a simple Bayer decoder.

Some of these steps will now be described in more detail.

Intermediate colour difference samples are calculated by bilinear interpolation, using a [1 2 1]/4 filter, and then the green sample values are added back on to generate a complete grid of R and of B samples. These decoded pixels are referred to as pixels $p_2$.

Then a "soft" decoding of the red and blue signals is carried out using [1 2 2 2 2 2 2 2 1]/16 filters horizontally and vertically. The soft decoded pixels are referred to as $p_f$.

Then a "cross-colour suppression signal" is generated as follows. First a "cross-colour weighting signal" is calculated from the colour difference signals u=B−G and v=R−G. A colour might be cross-colour if u+v is close to 0 and if u−v is away from 0. So the cross-colour weighting signal is formed as a function of the sum and difference of the colour difference signals. A suitable example of the cross-colour weighting signal is given by:

$$w = \frac{\max\{0, 32 - |u, v|\} \cdot \min\{64, |u - v|\}}{2048}$$

The variance of potential cross-colour is then calculated along the u+v=0 axis, for example within an aperture H given by horizontal and vertical apertures [1 2 2 2 2 2 2 2 2 2 2 2 2 2 2 2 1]/32 (17 taps), and multiplied by the activity measure á to get a cross-colour suppression signal:

$$\beta = \max\left\{0, \min\left\{1, \frac{á}{32}\left[\frac{H(w(u-v)^2)}{H(w)} - \left(\frac{H(w(u-v))}{H(w)}\right)^2\right]\right\}\right\}$$

Where the activity measure a=|g| is filtered horizontally (with for example a filter [1 2 1]/4) and then vertically (with for example a filter [1 2 1]/4) to make á.

Finally, the cross-colour suppression signal is used to mix between the original decoded picture and the soft decoded picture:

$$p_x = \beta p_f + (1-\beta)p_2$$

It will be understood that a wide variety of modifications are possible without departing from the scope of this invention. Different techniques can be employed for deriving G (or appropriate other colour) values at each pixel. Existing sample values can be maintained, with interpolation being used to provide G values at R and B sites. Or, as in the examples above, G values can be interpolated at every pixel.

Other interpolation filters than those described can be used to derive the two full resolution grids of each colour difference signal, with the second interpolation filter taking a larger number of colour difference signal inputs than the first interpolation filter. The cross-colour weighting signal may be formed in other ways, for example as a different function of the sum and difference of the colour difference signals. Similarly, a cross-colour suppression signal can be derived in various ways from the cross-colour weighting signal, using the variance being one example.

The invention claimed is:

1. An apparatus for decoding a Bayer-mask or like coded image comprising a value for one of a set of colours at each pixel of the image to provide a decoded value for each of the set of colours at each pixel of the image, the apparatus comprising:
   a selected colour interpolation filter configured to derive from the coded image an array having for a selected colour a value at each pixel of the image, said array forming a first decoded colour value output;
   a colour differentiator configured to calculate from the array a colour difference signal at each of the pixels associated with other colours;
   a first interpolation filter configured to derive a first full-resolution grid of each colour difference signal;
   a second interpolation filter configured to derive a second full-resolution grid of each colour difference signal using a larger number of colour difference signal inputs than said first interpolation filter;
   a cross colour measurer configured to generate a cross-colour weighting signal having a value at each pixel formed by a sum and difference of the colour difference signals, and further configured to generate a cross-colour suppression signal based on a variance of the cross-colour weighting signal;
   a mixer configured to form a mixed colour difference signal from said first and second full-resolution grids in accordance with said cross-colour suppression signal; and
   a signal combiner configured to mix said mixed colour difference signal and said first decoded colour value output to derive at least second and third decoded colour value outputs.

2. The apparatus of claim 1, wherein the selected colour is green and the other colours are red and blue.

3. The apparatus of claim 1, wherein the variance is formed along an axis on which the colour difference signals are equal.

4. The apparatus of claim 1, wherein the variance is formed in a rolling window.

5. The apparatus of claim 1, further comprising an activity measure configured to calculate an activity value at a pixel;

wherein the variance of the cross-colour weighting signal is multiplied by said activity value.

6. The apparatus of claim 5, wherein the activity value is derived by forming the absolute value of a spatial gradient at each pixel and applying a spatial filter.

7. An imaging system comprising a light sensor array, a Bayer mask and apparatus according to claim 1.

8. The apparatus of claim 1, wherein the cross colour measurer is configured to generate the cross-colour weighting signal from the sum and difference of the colour difference signals derived from the first interpolation filter.

9. A method of decoding a Bayer-mask or like coded image comprising a value for one of a set of colours at each pixel of the image to provide a decoded value for each of the set of colours at each pixel of the image, the method comprising:
- deriving from the coded image an array having for a selected colour a value at each pixel of the image, said array forming a first decoded colour value output;
- calculating from the array a colour difference signal at each of the pixels associated with other colours;
- deriving a first full-resolution grid of each colour difference signal using a first interpolation filter;
- deriving a second full-resolution grid of each colour difference signal using a second interpolation filter that uses a larger number of colour difference signal inputs than said first interpolation filter;
- generating a cross-colour weighting signal having a value at each pixel formed by a sum and difference of the colour difference signals;
- forming a mixed colour difference signal from said first and second full-resolution grids in accordance with a cross-colour suppression signal derived from a variance of said cross-colour weighting signal; and
- combining said mixed colour difference signal and said first decoded colour value output to derive at least second and third decoded colour value outputs.

10. The method of claim 9, wherein the selected colour is green and the other colours are red and blue.

11. The method of claim 9, further comprising forming the variance along an axis on which the colour difference signals are equal.

12. The method of claim 9, further comprising forming the variance in a rolling window.

13. The method of claim 9, further comprising multiplying the variance of the cross-colour weighting signal by a local activity measure.

14. The method of claim 13, further comprising deriving the local activity measure by forming the absolute value of a spatial gradient at each pixel and applying a spatial filter.

15. The method of claim 9, further comprising generating the cross-colour weighting signal from the sum and difference of the colour difference signals derived using the first interpolation filter.

16. A tangible, non-transitory computer program product configured to cause a programmable apparatus to implement a method of decoding in a processor a Bayer-mask or like coded image comprising a value for one of a set of colours at each pixel of the image to provide a decoded value for each of the set of colours at each pixel of the image, the implemented method comprising:
- deriving from the coded image an array having for a selected colour a value at each pixel of the image, said array forming a first decoded colour value output;
- calculating from the array a colour difference signal at each of the pixels associated with other colours;
- deriving a first full-resolution grid of each colour difference signal using a first interpolation filter;
- deriving a second full-resolution grid of each colour difference signal using a second interpolation filter that uses a larger number of colour difference signal inputs than said first interpolation filter;
- generating a cross-colour weighting signal having a value at each pixel formed by a sum and difference of the colour difference signals;
- forming a mixed colour difference signal from said first and second full-resolution grids in accordance with a cross-colour suppression signal derived from a variance of said cross-colour weighting signal; and
- combining said mixed colour difference signal and said first decoded colour value output to derive at least second and third decoded colour value outputs.

17. The computer program product of claim 16, wherein the implemented method further comprises generating the cross-colour weighting signal from the sum and difference of the colour difference signals derived using the first interpolation filter.

* * * * *